United States Patent
Thomas et al.

(10) Patent No.: US 11,844,031 B2
(45) Date of Patent: Dec. 12, 2023

(54) COMPONENT CARRIER MANAGEMENT SERVICE

(71) Applicant: Verizon Patent and Licensing Inc., Basking Ridge, NJ (US)

(72) Inventors: Mathew Thomas, Madison, NJ (US); Sachin Vargantwar, Cumming, GA (US); Maulik Shah, Carrollton, TX (US); Nischal Patel, Hillsborough, NJ (US); Nicholas James Cordaro, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 110 days.

(21) Appl. No.: 17/177,405

(22) Filed: Feb. 17, 2021

(65) Prior Publication Data

US 2022/0264480 A1  Aug. 18, 2022

(51) Int. Cl.
*H04W 52/36* (2009.01)
*H04W 72/1268* (2023.01)
*H04W 52/24* (2009.01)
*H04W 24/08* (2009.01)
*H04W 72/0453* (2023.01)

(52) U.S. Cl.
CPC ......... *H04W 52/365* (2013.01); *H04W 24/08* (2013.01); *H04W 52/242* (2013.01); *H04W 72/0453* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2008/0095263 A1* | 4/2008 | Xu | H04L 1/0021 375/295 |
| 2010/0027431 A1* | 2/2010 | Morrison | H04L 41/5009 370/252 |
| 2012/0002577 A1* | 1/2012 | Ishii | H04W 72/082 370/281 |
| 2015/0172032 A1* | 6/2015 | Khay-Ibbat | H04L 5/001 370/329 |
| 2016/0119930 A1* | 4/2016 | Yan | H04L 1/0061 370/329 |
| 2016/0278106 A1* | 9/2016 | Jarrahi Khameneh | H04L 1/0027 |
| 2020/0053659 A1* | 2/2020 | Wang | H04W 72/1268 |
| 2021/0250876 A1* | 8/2021 | Akkarakaran | H04W 52/242 |
| 2022/0110175 A1* | 4/2022 | Marupaduga | H04W 52/365 |
| 2022/0210749 A1* | 6/2022 | Jang | H04W 24/10 |

FOREIGN PATENT DOCUMENTS

| | | | | | |
|---|---|---|---|---|---|
| CN | 109996321 A | * | 7/2019 | | |
| EP | 3358778 A1 | * | 8/2018 | ............... | H04L 5/00 |

* cited by examiner

*Primary Examiner* — The Hy Nguyen

(57) ABSTRACT

A method, a device, and a non-transitory storage medium are described in which an component carrier management service is provided. The service may monitor data pertaining to a transmit power of an end device and a component carrier of a carrier aggregation. Based on the monitoring, the service may determine when the end device is at or near a maximum transmit power. The service may perform a mitigation procedure to prevent or minimize the end device shutting off a component carrier in a radio transmitter chain.

20 Claims, 11 Drawing Sheets

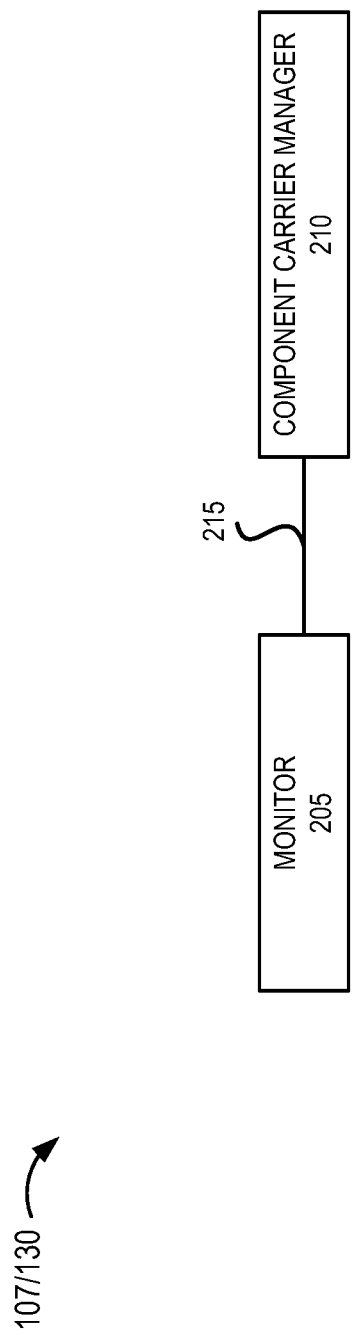

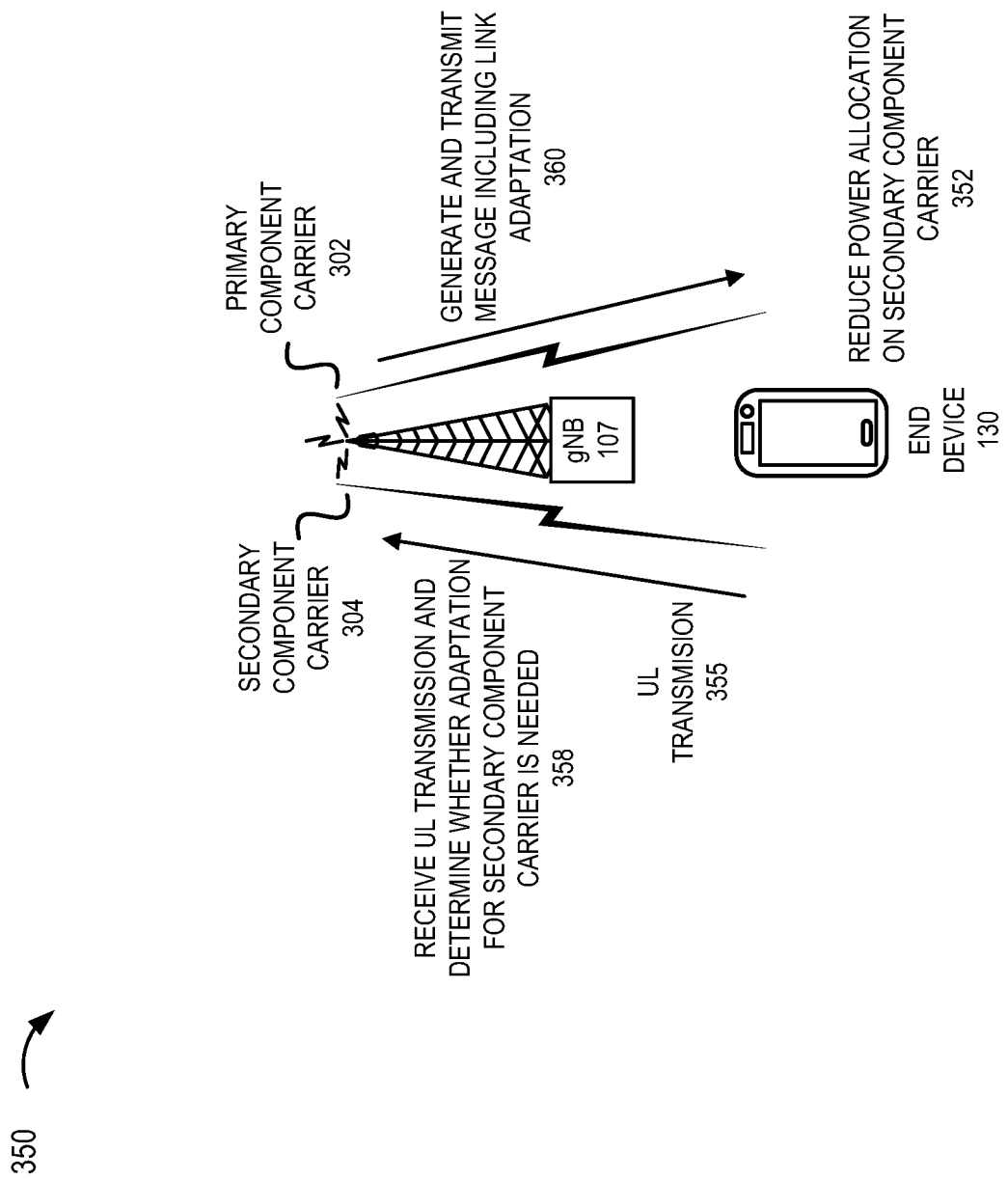

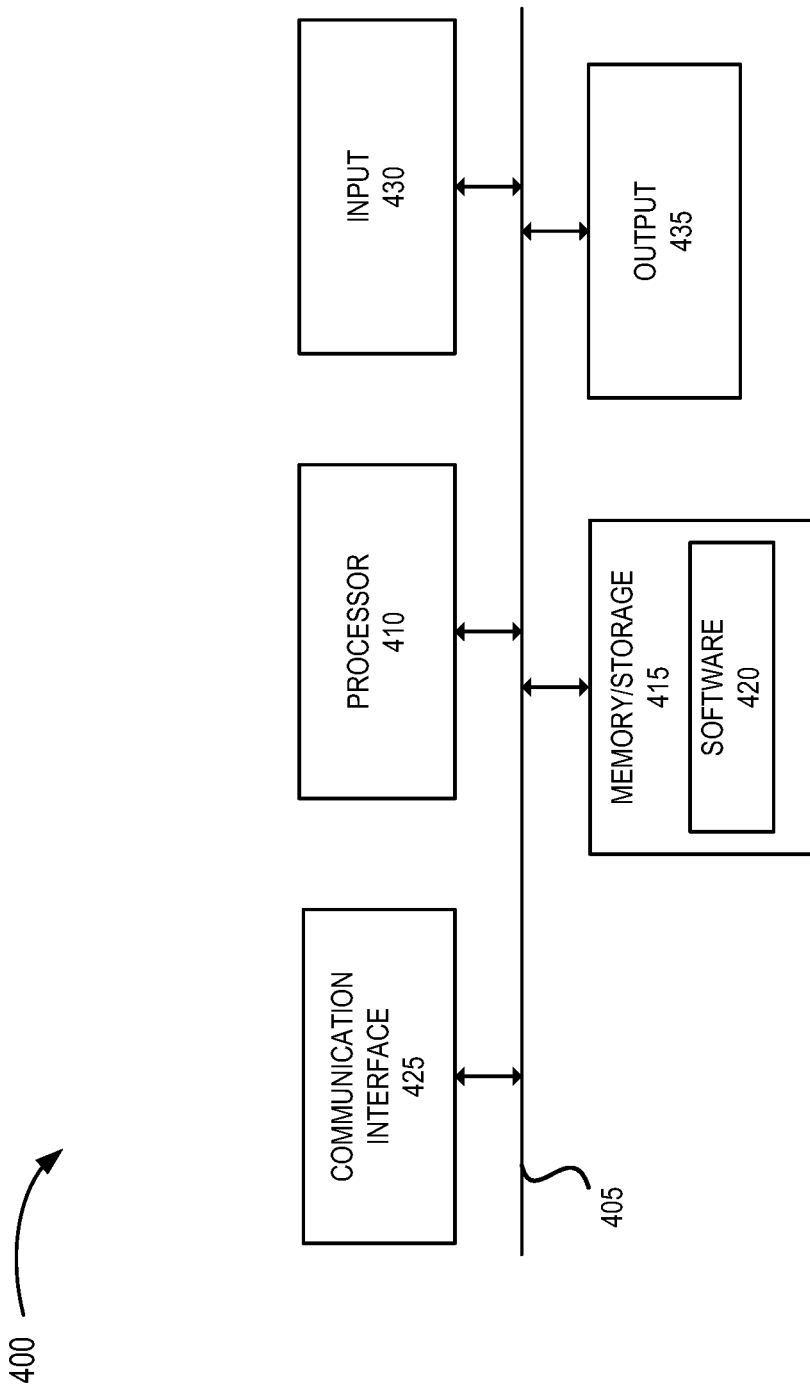

COMPONENT CARRIER MANAGEMENT SERVICE

BACKGROUND

Development and design of networks present certain challenges from a network-side perspective and an end device perspective. For example, Centralized Radio Access Network (C-RAN), Open Radio Access Network (O-RAN), and split RAN architectures have been proposed to satisfy the increasing complexity, densification, and demands of end device application services of a future generation network.

BRIEF DESCRIPTION OF THE DRAWINGS

FIG. 2 is a diagram illustrating exemplary components in which an exemplary embodiment of the component carrier management service may be implemented;

FIGS. 3A-3E are diagrams illustrating exemplary processes of exemplary embodiments of the component carrier management service;

FIG. 4 is a diagram illustrating exemplary components of a device that may correspond to one or more of the devices illustrated and described herein;

DETAILED DESCRIPTION

Figure 1:
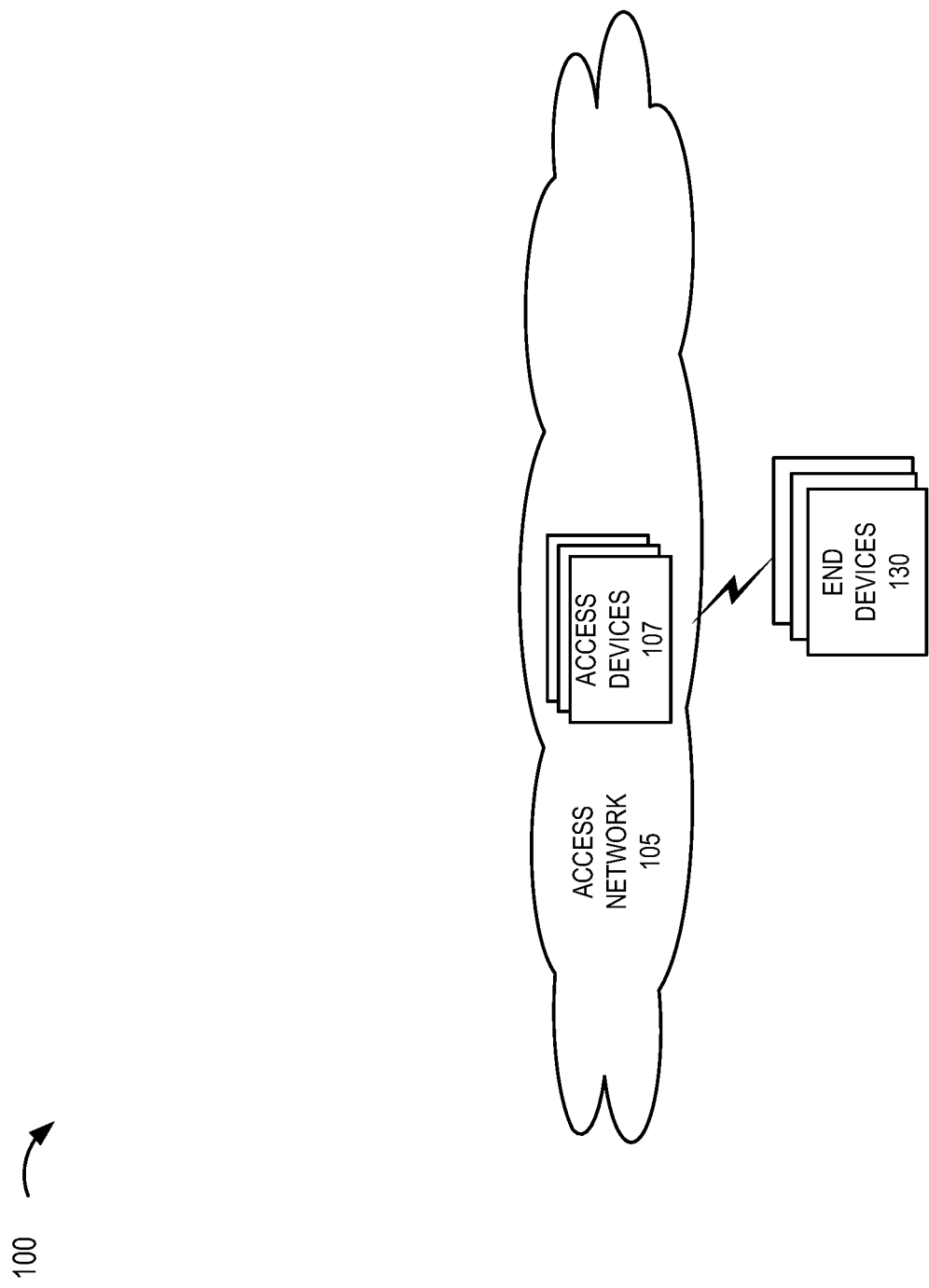
FIG. 1 is a diagram illustrating an exemplary environment in which an exemplary embodiment of a component carrier management service may be implemented.

The following detailed description refers to the accompanying drawings. The same reference numbers in different drawings may identify the same or similar elements. Also, the following detailed description does not limit the invention.

A RAN may support carrier aggregation (CA) in which connectivity between an end device and the RAN may use multiple frequency bands. Each aggregated carrier may be referred to as a component carrier (CC) (also known as a "cell"). One of the component carriers or cells may be referred to as a primary component carrier or a primary cell (PCell) and one or multiple other component carriers or cells may be referred to as a secondary component carrier(s) or a secondary cell(s) (SCell(s)). There are various implementations of carrier aggregation, such as intra-band, contiguous; intra-band, non-contiguous; inter-band, non-contiguous; carrier aggregation in the uplink (UL); carrier aggregation in the downlink (DL); carrier aggregation according to various duplexing schemes (e.g., time division duplex (TDD), frequency division duplex (FDD), etc.); the number of component carriers to use; and the bandwidth of a component carrier, for example.

The end device, which is carrier aggregation capable, may manage power for carrier aggregation connectivity. For example, when the end device is power limited, the end device may prioritize transmitting on a primary component carrier over a secondary component carrier. Based on this power state, the end device may deactivate the transmission of an uplink component carrier by a radio chain, for example. However, such action may be performed unilaterally on the end device side with no signaling or communication with the RAN, such that the RAN continues to attempt to receive data on such secondary component carrier when the end device is not transmitting via the secondary component carrier. This can negatively impact the performance of the system and communications (e.g., lower throughput and/or other performance metric).

According to exemplary embodiments, a component carrier management service is described. According to various exemplary embodiments, the component carrier management service may be provided by an end device, a RAN device, or both.

According to an exemplary embodiment, the component carrier management service may include a monitoring service. According to an exemplary embodiment, the monitoring service may monitor a transmit power value of the end device that is associated with a component carrier of a carrier aggregation, as described herein. The monitoring service may compare the transmit power value to a threshold transmit power value, as described herein. Based on a result of the comparison, the monitoring service may determine a component carrier shutoff state of the end device associated with a component carrier of a carrier aggregation. According to another exemplary embodiment, the monitoring service may monitor and/or estimate a pathloss value relative to the end device. Based on the pathloss value, the monitoring service may determine whether the end device is nearing or at component carrier shutoff state, as described herein. According to yet another exemplary embodiment, the monitoring service may monitor uplink transmissions from the end device to determine the component carrier shutoff state of the end device, as described herein.

According to an exemplary embodiment, the component carrier management service may include a mitigation service. The mitigation service may minimize, prevent, and/or recover from the component carrier shutoff state at the end device. According to various exemplary embodiments, the mitigation service may use a proactive approach, a reactive approach, or both, as described herein.

In view of the foregoing, the component carrier management service may improve system performance between end devices and a RAN. For example, the component carrier management service may improve spectrum efficiency by optimizing usage of underutilized spectrum and other types of system performance aspects (e.g., component carrier load balancing, etc.). The component carrier management service may increase throughput, data rate, reliability, latency, UL coverage footprint, and other performance metrics of communications based on the management of component carriers in carrier aggregation. Also, the component carrier management service may improve other performance indicators, such as a key performance indicator (KPI), quality of experience (QoE), a service level agreement (SLA) requirement, user experience, and/or a mean opinion score (MOS), for example.

FIG. 1 is a diagram illustrating an exemplary environment 100 in which an exemplary embodiment of the component carrier management service may be implemented. As illustrated, environment 100 includes an access network 105. Environment 100 further includes end devices 130 (also referred to individually or generally as end device 130).

The number, type, and arrangement of networks illustrated in environment 100 are exemplary. For example, according to other exemplary embodiments, environment 100 may include additional networks and/or different networks. For example, according to other exemplary embodiments, other networks not illustrated in FIG. 1 may be included, such as an X-haul network (e.g., backhaul, midhaul, fronthaul, etc.), a transport network (e.g., Signaling System No. 7 (SS7), etc.), a core network, an application layer network, and/or another type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, an external network, and/or a core network. According to an exemplary embodiment, access network 105 may be configured to support or provide the component carrier management service, as described herein.

Access network 105 may include different and multiple functional splitting, such as options 1, 2, 3, 4, 5, 6, 7, or 8 that relate to combinations of access network 105 and a core network including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), CU and DU, interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer service, an SCG bearer service, non-standalone (NSA), standalone (SA), etc.), carrier aggregation (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107 (also referred to individually or generally as access device 107). For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN gNB (O-gNB), O-RAN eNB (O-eNB)), a 5G ultrawide band (UWB) node, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level. According to an exemplary embodiment, one or multiple types of access devices 107, as described herein, include logic that provide the component carrier management service.

End device 130 may include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an Internet of Things (IoT) device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130. According to an exemplary embodiment, end device 130 includes the component carrier management service, as described herein.

FIG. 2 is a diagram illustrating exemplary components in which an exemplary embodiment of a component carrier management service may be implemented. As illustrated, access device 107 and/or end device 130 (illustrated as 107/130 in FIG. 2) may include a monitor 205 and/or a component carrier manager 210. Additionally, according to some exemplary embodiments, monitor 205 and component carrier manager 210 may be communicatively coupled via a link 215. For example, link 215 may be implemented as a hardware link (e.g., a bus, a shared memory space, etc.), a software link (e.g., inter-process communication (IPC), etc.) or some other type of communicative link (e.g., an application programming interface (API), a wired connection, an optical connection, a wireless connection, etc.). The number, type, and arrangement of components and links are exemplary. According to other exemplary embodiments, access device 107 and/or end device 130 may include additional, fewer, and/or different components to provide the component carrier management service or a sub-service, a function, and/or a step of a process in support of the component carrier management service, as described herein.

According to various exemplary embodiments, the component carrier management service may be implemented by access device 107, end device 130, or both. According to various exemplary embodiments, a function, a process, and/or a step of a function or a process of the component carrier management service may be implemented by access device 107, end device 130, or in some collaborative manner (e.g., access device 107 and end device 130). According to various exemplary embodiments, the component carrier management service my be implemented on a user plane, a control plane, or both.

Monitor 205 may include logic that provides a monitoring service. For example, monitor 205 may monitor, directly and/or indirectly based on one or multiple criteria, a transmit power value of end device 130 that may be associated with a component carrier.

According to an exemplary embodiment, access device 107 may monitor receipt of a power headroom report (PHR) from end device 130. For example, end device 130 may monitor its maximum transmit power and generate the power headroom report. The power headroom report may indicate the power headroom available at end device 130. For example, the power headroom report may include a value (e.g., a positive value, a negative value, a zero value, a value on a dB scale, etc.) that may indicate a difference between a maximum transmit power of end device 130 and a current transmit power of end device 130. For example, a positive value may indicate additional transmit power available under the maximum transmit power, and a negative value may indicate a transmit power demand that exceeds the maximum allowed transmit power of end device 130. The transmit power difference may relate to an uplink channel (e.g., an uplink shared channel for data transfer). According to some implementations, there may be a power headroom report for each component carrier. End device 130 may be configured to transmit the power headroom report to access device 107 according to a trigger event, such as when a downlink pathloss threshold is reached, according to a timer, activation and/or addition of a primary cell (PCell) or a secondary cell (SCell), or another configurable trigger event. Based on the power headroom report, access device 107 may determine when end device 130 may be near or at a maximum transmit power state, which may trigger a component carrier shut-off state at end device 130. Access device 107 may estimate current transmit power use at end device 130 and available headroom to use by the mitigation service.

According to another exemplary embodiment, access device 107 may use a pathloss estimation or in combination with the power headroom report to determine when end device 130 may be near or at a maximum transmit power state. For example, access device 107 may receive a reference signal (RS) (e.g., sounding RS and/or another type of RS) and use this information to estimate an uplink channel state. Access device 107 may use the estimated uplink channel state to provide link adaptation measures, which may include uplink transmission power control and other adaptive parameters (e.g., adaptive transmission bandwidth, adaptive transmission duration, adaptive modulation and channel coding rate, and/or another communication variable). Access device 107 may calculate an adjustment to transmit power of end device 130 based on an uplink pathloss estimation associated with a component carrier and other factors (e.g., interference, penetration loss, slow fading margin, and/or other variables that may be included in a link budget) to satisfy a received uplink signal quality from end device 130 (e.g., a signal-to-interference and noise ratio (SINK), a SNR, a dB value, etc.) pertaining to the component carrier. Access device 107 may store information indicating maximum transmit powers for a given end device 130, geographic location, and/or frequency bandwidth (e.g., cell, component carrier). Based on the stored information and the calculated transmit power, access device 107 may determine whether end device 107 is nearing an uplink component carrier shutoff state.

According to yet another exemplary embodiment, access device 107 may monitor scheduled transmissions via primary and secondary component carriers of the uplink from end device 130 to determine whether a component carrier shutoff state by the end device 130 has occurred. For example, when scheduled transmissions of data via a primary component carrier are received by access device 107 but scheduled transmission of data via a secondary component carrier has not been received, access device 107 may determine that end device 130 has shut off the secondary component carrier in the uplink of a radio chain. A radio frequency (RF) transmitter chain may include various components, such as, for example, an amplifier, a mixer, a digital-to-analog converter (DAC), a filter, an oscillator, a baseband processor, and/or other components that may support the radio transmission via a component carrier/cell. Access device 107 may make such a determination based on other factors, such as amount of time during which this occurs, number of times of such occurrence, and/or other configurable factors. The monitoring service, as described herein, may perform concurrently (e.g., in parallel) or serially different embodiments, as described herein.

Component carrier manager 210 may include logic that provides a mitigation service. For example, component carrier manager 210 may minimize or prevent end device 130 from shutting off a component carrier in the uplink of a radio chain, and/or recover from a component carrier shutoff state at end device 130. According to some exemplary embodiments, component carrier manager 210 may invoke the mitigation service in response to communication with monitor 205 and the monitoring service, as described herein. For example, when the monitoring service determines that end device 130 may enter the component carrier shutoff state or has entered the component carrier shutoff state, the mitigation service may be invoked.

According to an exemplary embodiment, access device 107 may use power control mechanisms that may reduce a transmit power requirement for end device 130 and increase a potential for a secondary carrier to remain powered up. According to various exemplary embodiments, the power control mechanisms may be implemented using open loop, closed loop, and/or inner loop power control mechanisms (e.g., inner loop may be a mechanism by which closed loop control may be implemented). For example, end device 130 may use an open loop power control mechanism to adjust a transmit power associated with a component carrier for the uplink to minimize or prevent from actuating a component carrier shutoff state associated with a component carrier in the uplink. According to another example, as a part of a closed loop or inner loop power control procedure, access device 107 may transmit a message to end device 130 via a downlink. The message may include a command (e.g., a transmit power control command) and/or other information of relevance for adjusting a transmit power of end device 130. End device 130 may adjust a transmit power associated with the component carrier in response to and based on the message.

According to another exemplary embodiment, access device 107 may allocate fewer physical resource blocks (PRBs) on a secondary carrier, which may reduce the transmit power required at end device 130. In this way, end device 130 may be able to avoid shutoff of a component carrier associated with a radio transmitter chain, keep a component carrier active with fewer physical resource blocks, and sustain or minimize degradation of throughput and other performance metrics.

According to yet another exemplary embodiment, access device 107 may allocate uplink resources on fewer secondary component carriers or even only the primary component carrier. In this way, some or none of the secondary component carriers may remain active until sufficient power is available at end device 130. When the power condition at end device 130 improves (e.g., determined based on the monitoring service), any secondary component carrier that had been deactivated may be activated.

According to still another exemplary embodiment, end device 130 may reduce the power allocation on a secondary carrier. End device 130 may prioritize power allocation on a primary carrier. In this way, end device 130 may be able to avoid component carrier shutoff in a radio transmitter chain while reducing uplink transmit power. Access device 107 may receive data via the secondary carrier with potentially lower quality, and link adaptation measures may be invoked to adjust parameters (e.g., lower modulation and coding scheme (MCS) and/or modify other parameters and values, such as Block Error Rate (BLER) target, etc.) to enable the secondary component carrier to positively contribute to the overall aggregate throughput and other performance metrics. The mitigation service, as described herein, may perform concurrently (e.g., in parallel) or serially different embodiments, as described herein.

FIGS. 3A-3E are diagrams illustrating exemplary processes of an exemplary embodiment of the component carrier management service. As illustrated, gNB 107 is depicted and described as an exemplary access device 107 according to exemplary scenarios. According to other exemplary scenarios, access device 107 may be implemented by a different network device, such as an eNB, an eLTE eNB, a DU, a DU and a CU, an O-RAN gNB, an O-RAN eNB, a future generation wireless station (e.g., 5.5G, 6G, 6.5G, 7G, etc.), or other suitable access device 107, as described herein. Additionally, or alternatively, according to various exemplary scenarios, the component carrier management service may be implemented in an LTE-A, LTE-A Pro, 5G, a future RAN environment, or other suitable RAN environment (e.g., WiFi or other multi-carriers/cells connectivity environment). As further illustrated, FIGS. 3A-3E illustrate a primary component carrier 302 and a secondary component carrier 304 according to an exemplary scenario. For purposes of description, secondary component carrier 304 may include one or multiple second component carriers.

Figure 3A:
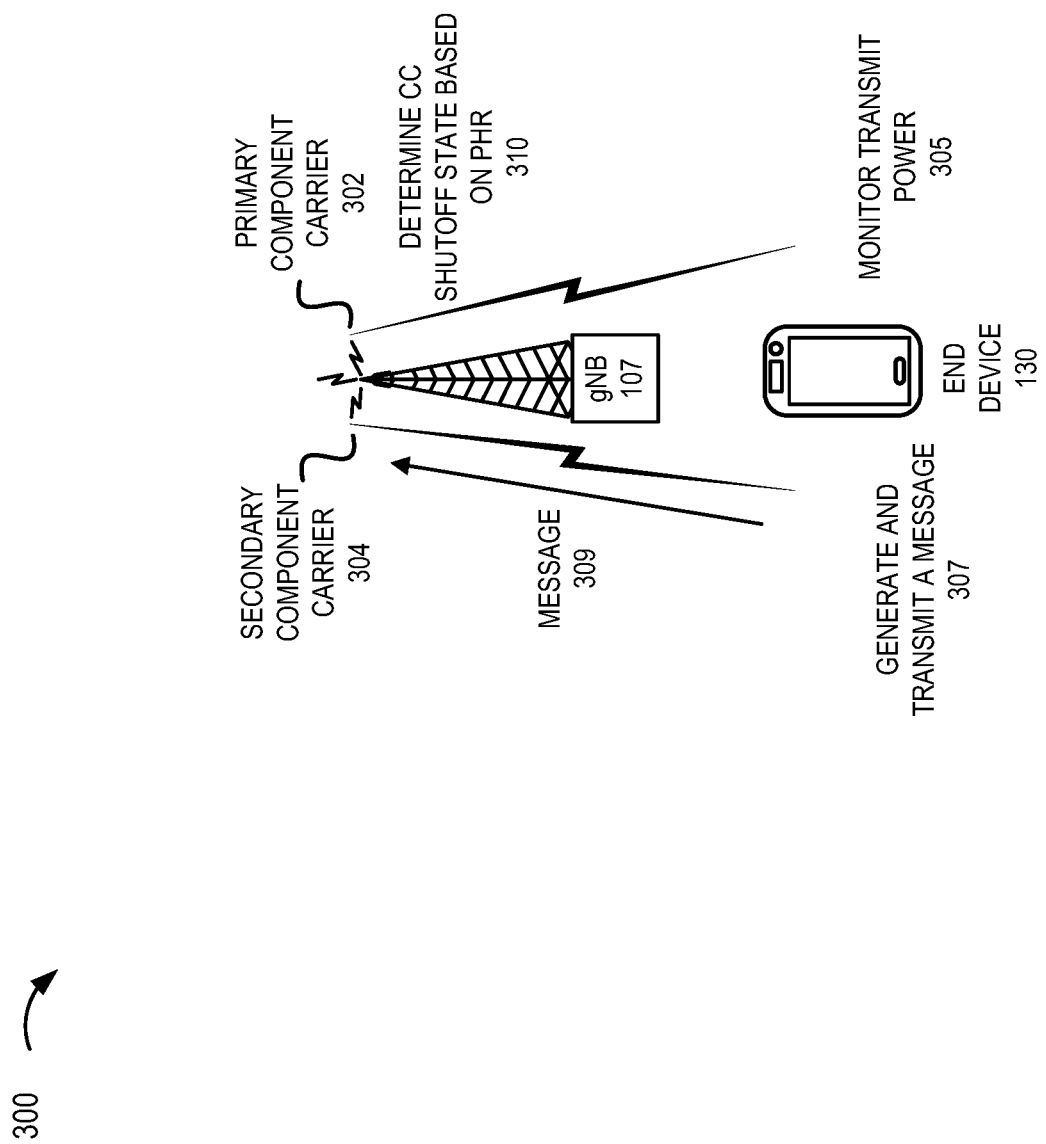

Referring to FIG. 3A, a process 300 may include an exemplary embodiment of the monitoring service, as described herein. For example, end device 130 may monitor 305 a maximum transmit power and/or a transmit power for a component carrier associated with carrier aggregation. Based on the monitoring, end device 130 may generate and transmit a message 307 to gNB 107. For example, a message 309 may be a power headroom report or another type of message that may include transmit power information pertaining to end device 130 and a component carrier associated with carrier aggregation. Based on receiving message 309, gNB 107 may analyze message 309 and determine a component carrier shutoff state based on the analysis 310. According to some exemplary embodiments, gNB 107 may compare a transmit power value or a headroom power value included in message 309 to a threshold value. As an example, the threshold value may be X decibels (dB) below a maximum transmit power for end device 130. According to another example, the threshold value may be a power headroom value. According to various exemplary implementations, the threshold value may be a dynamic value or a static value (e.g., the value of X). According to some exemplary implementations, the threshold value may be component carrier-specific (e.g., frequency band, primary component carrier versus secondary component carrier, etc.), communication plane-specific (e.g., user plane, control plane, etc.). Based on a result of the comparison, gNB 107 may determine if end device 130 is nearing or at a component carrier shut-off state, is remaining in a component carrier shut-off state, or is not nearing a component carrier shut-off state, for example.

According to other exemplary embodiments, gNB 107 may determine the component carrier shut-off state of end device 130 based on a pathloss estimation pertaining to a component carrier or based on message 309 and the pathloss estimation, as described herein.

According to an exemplary embodiment, when gNB 107 determines that end device 130 is nearing or at a component carrier shut-off state or is remaining in a component carrier shut-off state, gNB 107 may invoke or continue to provide the mitigation service, as described herein.

Figure 3B:
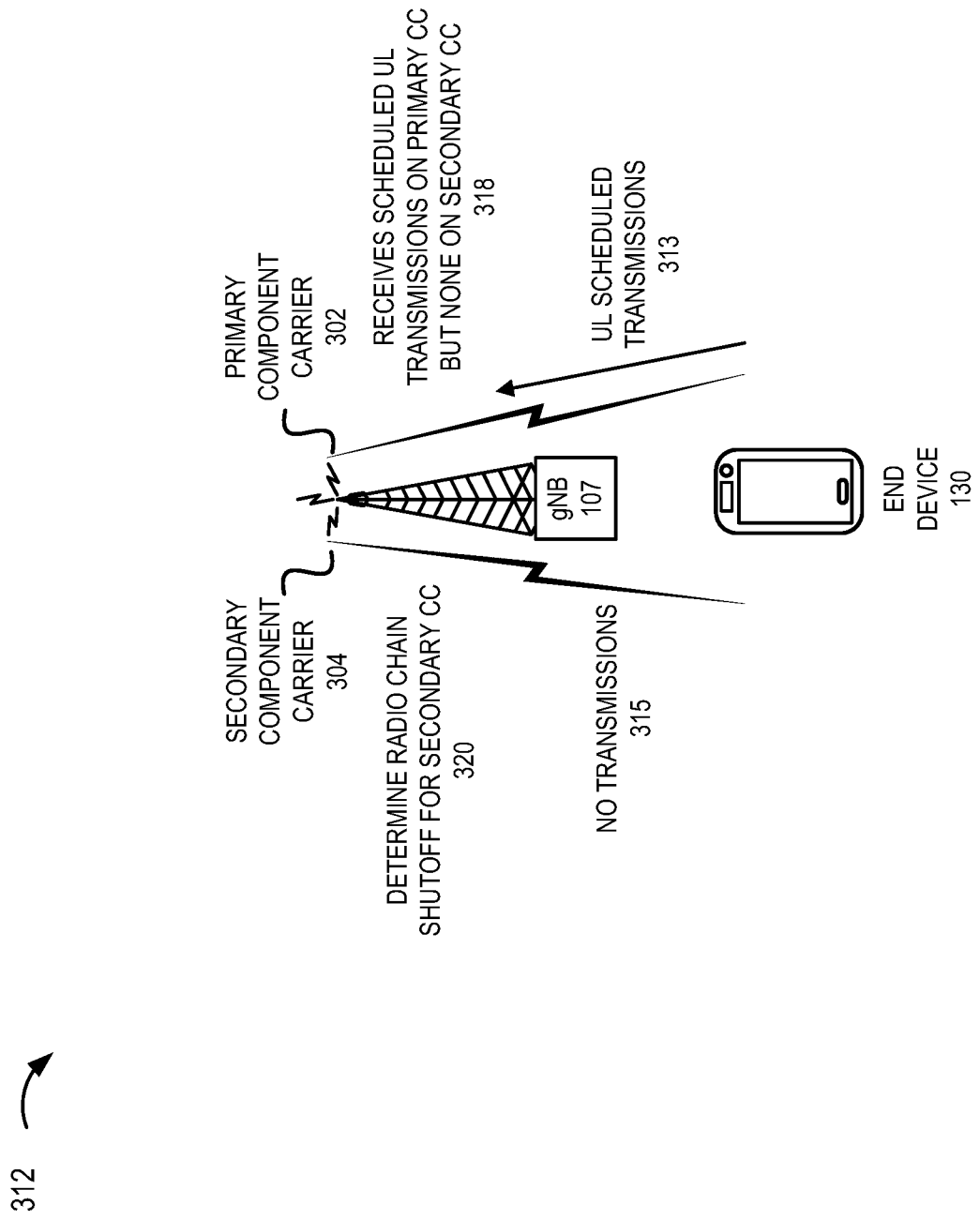

Referring to FIG. 3B, a process 312 may include an exemplary embodiment of the monitoring service, as described herein. For example, end device 130 may transmit (user plane) data via primary component carrier 302 according to an uplink schedule 313, but does not transmit (user plane) data 315 via secondary component carrier 304, which is not in accordance with an uplink schedule. gNB 107 may receive uplink scheduled transmissions 313 of user plane data via primary component carrier 302, but may not receive any transmissions 318 via secondary component carrier 304. Based on these circumstances, gNB 107 may determine that end device 130 is in a component carrier shut-off state 320 pertaining to secondary component carrier 304. gNB 107 may invoke the mitigation service pertaining to secondary component carrier 304.

Figure 3C:
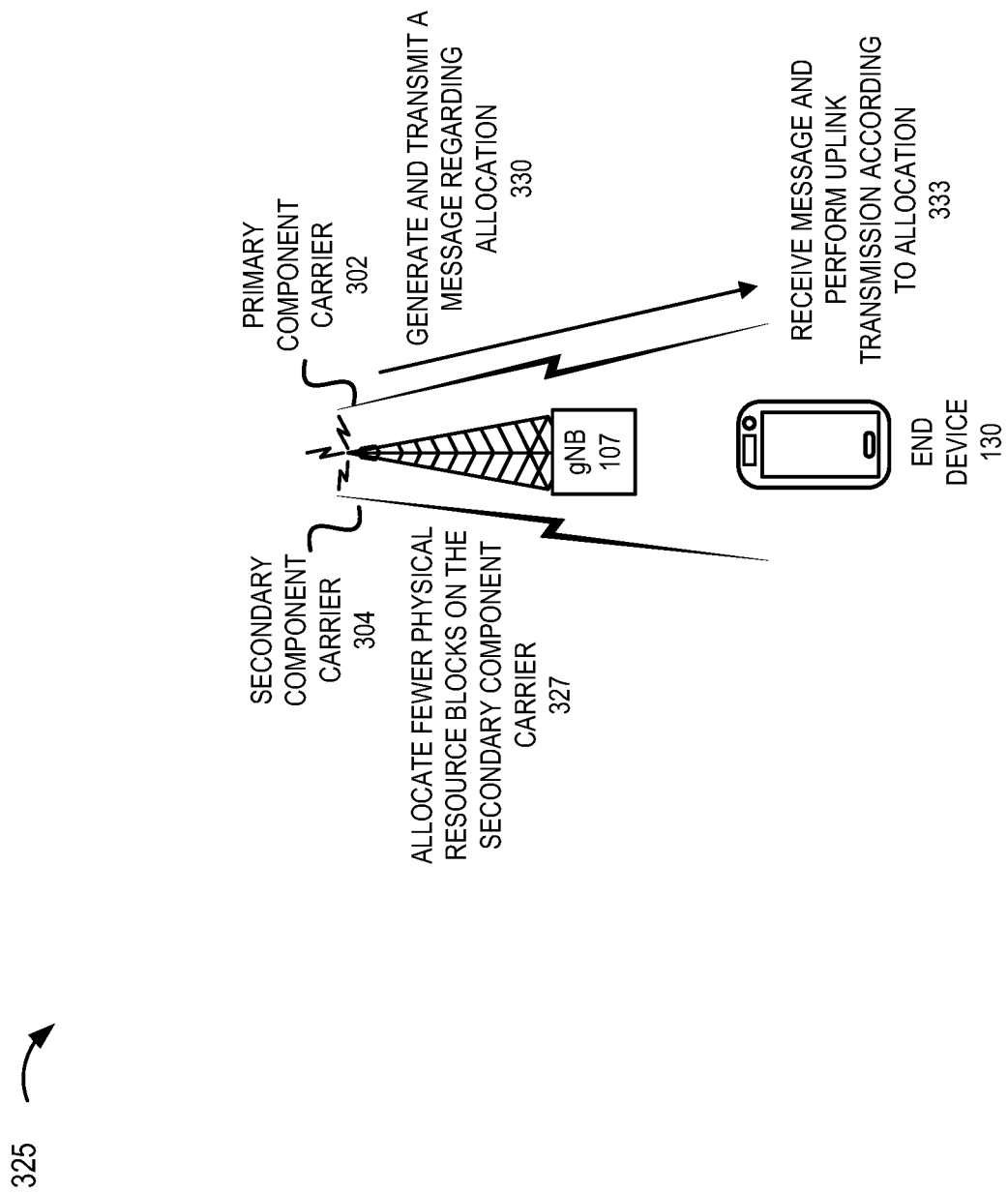

Referring to FIG. 3C, a process 325 may include an exemplary embodiment of the mitigation service, as described herein. For example, responsive to the monitoring service, gNB 107 may allocate fewer physical resource blocks 327 on a secondary component carrier 304. According to an exemplary embodiment, gNB 107 may calculate the number of physical resource blocks based on a transmit power value, a headroom power value, pathloss estimation, the threshold value, and/or another criterion. For example, the criterion may include a category of the application service (e.g., real-time, non-real-time, mission critical, machine-type communications (MTC), delay-tolerant, etc.) to which the uplink traffic pertains, a performance metric associated with the application service (e.g., latency, bitrate, throughput, reliability, etc.), and/or another configurable factor of relevance. As further illustrated, gNB 107 may generate and transmit a message regarding the allocation 330, and end device 130 may receive the message and perform uplink transmission according to the allocation 333.

Figure 3D:
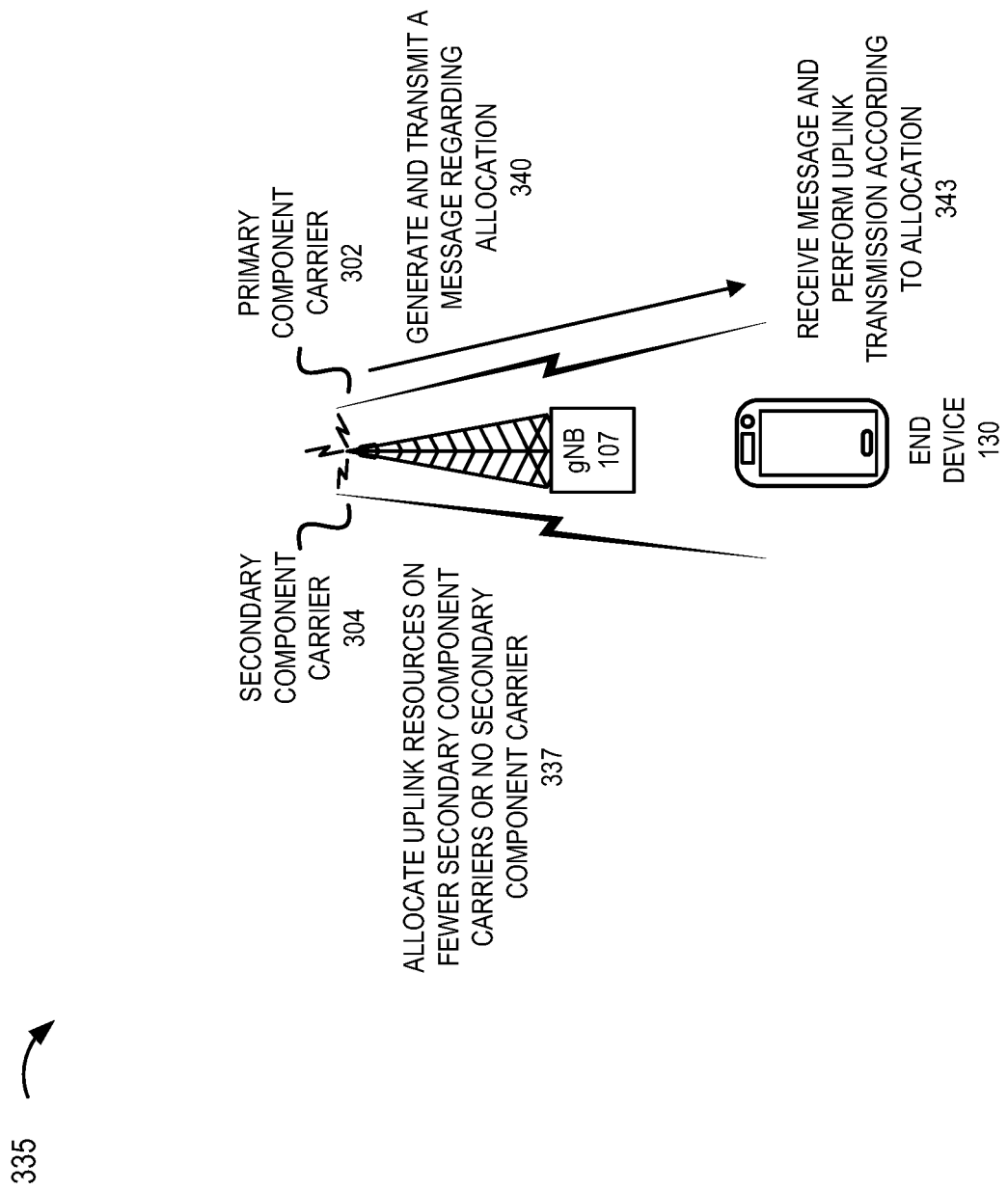

Referring to FIG. 3D, a process 335 may include another exemplary embodiment of the mitigation service, as described herein. For example, responsive to the monitoring service, gNB 107 may allocate uplink resources on fewer secondary component carriers or no secondary component carrier 337. As further illustrated, gNB 107 may generate and transmit a message regarding the allocation 340, and end device 130 may receive the message and perform uplink transmission according to the allocation 343.

Referring to FIG. 3E, a process 350 may include yet another exemplary embodiment of the mitigation service, as described herein. For example, responsive to the monitoring service, end device 130 may reduce a transmit power allocated on a secondary component carrier 352. Subsequent thereto, end device 130 may perform an uplink transmission 355 via a secondary component carrier 304 according to the power transmit reduction. gNB 107 may receive the uplink transmission and determine whether adaptation for the secondary component carrier is needed 358. For example, gNB 107 may apply one or multiple criteria, such as error rate, reliability, and/or another configurable criterion. According to this exemplary scenario, assume that gNB 107 determines that link adaptation is needed. As such, gNB 107 may generate and transmit a message that includes link adaptation information 360. For example, the adaptation may relate to a modulation and coding scheme and/or another type of link adaptative parameter. Although not illustrated, end device 130 may receive the message and perform link adaptation for the secondary component carrier.

FIG. 4 is a diagram illustrating exemplary components of a device 400 that may be included in one or more of the devices described herein. For example, device 400 may correspond to access device 107 and end device 130, as described herein. The exemplary components illustrated and described in relation to FIG. 2 may be implemented based on one or multiple components illustrated and described in relation to FIG. 4. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to access device 107, software 420 may include an application that, when executed by processor 410, provides a function, a process, and/or a step of the component carrier management service, such as a monitoring service and/or a mitigation service, as described herein. Additionally, with reference to end device 130, software 420 may include an application that, when executed by processor 410, provides a function, a process, and/or a step of the component carrier management service, such as a monitoring service and/or a mitigation service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
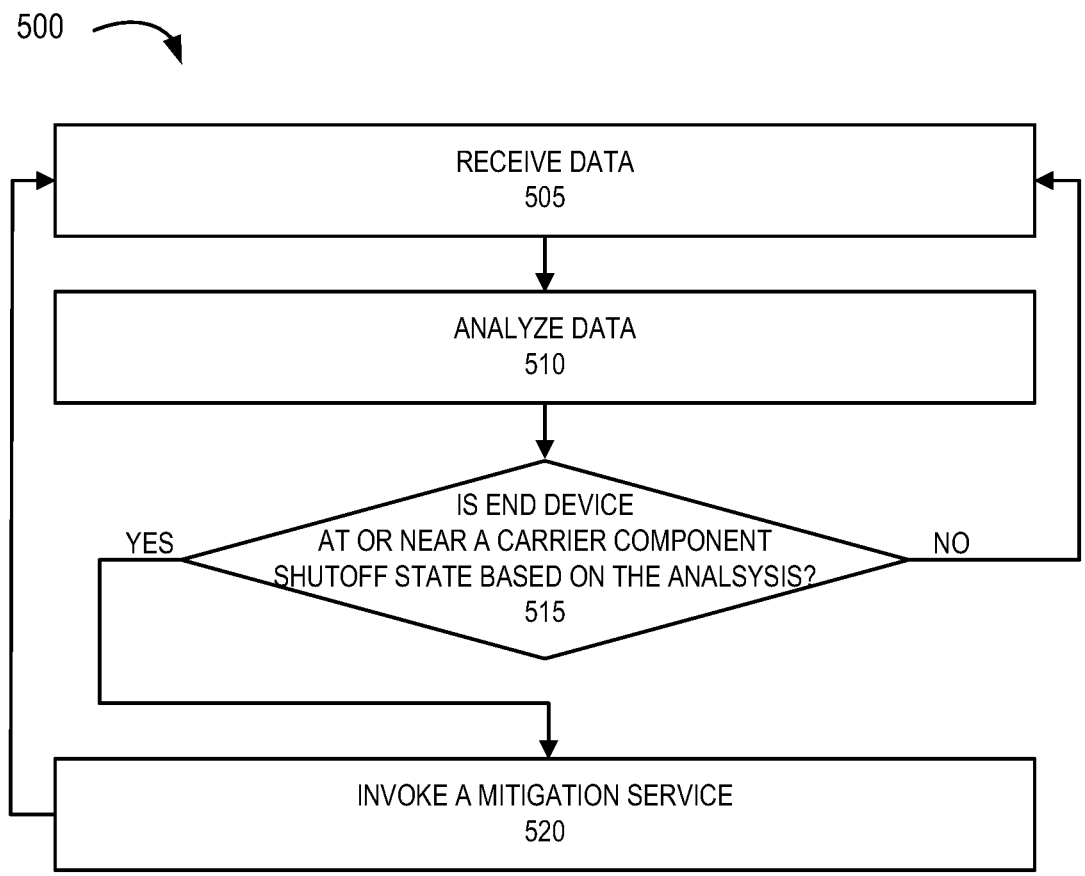
FIG. 5 is a flow diagram illustrating an exemplary process of an exemplary embodiment of the component carrier management service.

FIG. 5 is a flow diagram illustrating an exemplary process 500 of an exemplary embodiment of the component carrier management service. According to an exemplary embodiment, access device 107 and/or end device 130 may perform a step of process 500. According to an exemplary implementation, processor 410 executes software 420 to perform the step of process 500, as described herein. Alternatively, the step may be performed by execution of only hardware.

In block 505, data may be received. For example, the data may be generated based on the monitoring service, as described herein. For example, end device 130 may measure its own transmit power, access device 107 may receive a power headroom report from end device 130, or access device 107 may obtain data pertaining to pathloss, and/or uplink transmissions via a component carrier, as described herein.

In block 510, the data may be analyzed. For example, end device 130 may compare a transmit power value to a threshold value, or access device 107 may compare a headroom value and/or a pathloss estimation value to a corresponding threshold value. According to another example, access device 107 may evaluate the uplink transmissions received via the carrier components relative to the transmission scheduling for the carrier components. For example, access device 107 may determine whether an absence of an uplink transmission occurred despite an uplink scheduling, as described herein.

In block 515, it may be determined whether the end device is at or near a carrier component carrier shutoff state based on the analysis. For example, access device 107 or end device 130 may determine the component carrier shutoff state based on a result of the comparison. Alternatively, for example, access device 107 may determine the component carrier shutoff state based on the uplink transmission and the uplink scheduling.

When it is determined that the end device is not in or nearing the component carrier shutoff state (block 515—NO), process 500 may return to block 505.

When it is determined that the end device is in or nearing the component carrier shutoff state (block 515—YES), a mitigation service may be invoked (block 520). For example, access device 107 or end device 130 may provide the mitigation service to minimize, prevent, or recover from a component carrier shutoff state associated with end device 130.

FIG. 5 illustrates an exemplary embodiment of a process of the component carrier management service, however according to other exemplary embodiments, the component carrier management service may perform additional operations, fewer operations, and/or different operations than those illustrated and described.

Figure 6:
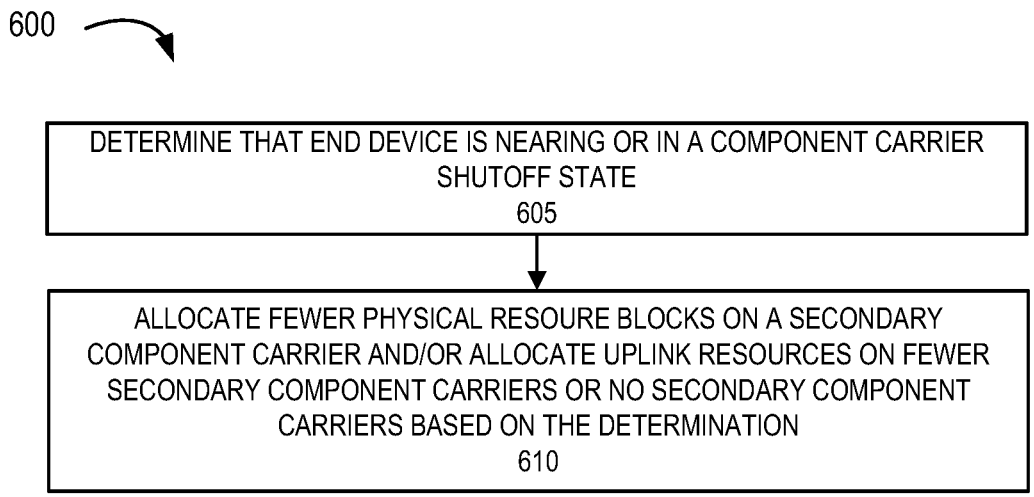
FIG. 6 is a flow diagram illustrating another exemplary process of an exemplary embodiment of the component carrier management service.

FIG. 6 is a flow diagram illustrating an exemplary process 600 of an exemplary embodiment of the component carrier management service. According to an exemplary embodiment, access device 107 may perform a step of process 600. According to an exemplary implementation, processor 410 executes software 420 to perform the step of process 600, as described herein. Alternatively, the step may be performed by execution of only hardware.

In block 605, access device 107 may determine that end device 130 is nearing or in a component carrier shutoff state. For example, access device 107 may make this determination based on the monitoring service, as described with respect to process 500.

In block 610, access device 107 may allocate fewer physical resource blocks on a secondary component carrier and/or allocate uplink resources on fewer secondary component carriers or no secondary component carriers based on the determination.

FIG. 6 illustrates an exemplary embodiment of a process of the component carrier management service, however according to other exemplary embodiments, the component carrier management service may perform additional operations, fewer operations, and/or different operations than those illustrated and described.

Figure 7:
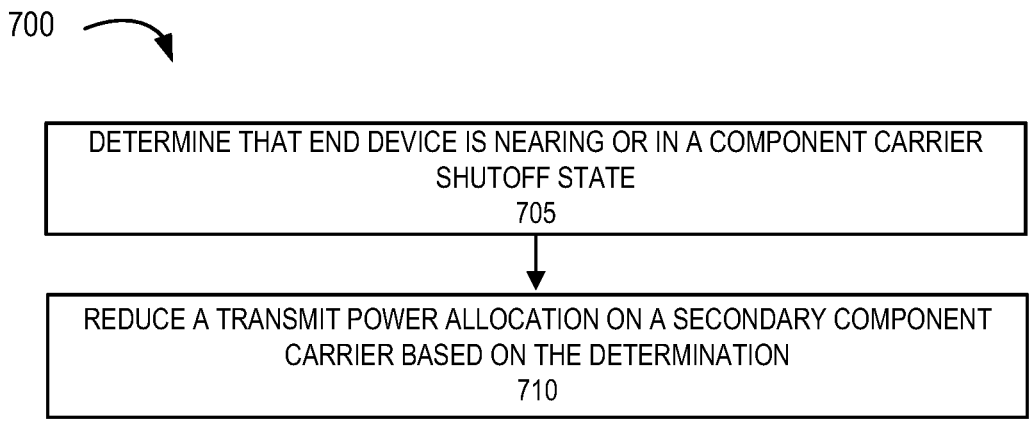
FIG. 7 is a flow diagram illustrating yet another exemplary process of an exemplary embodiment of the component carrier management service.

FIG. 7 is a flow diagram illustrating an exemplary process 700 of an exemplary embodiment of the component carrier management service. According to an exemplary embodiment, end device 130 may perform a step of process 700. According to an exemplary implementation, processor 410 executes software 420 to perform the step of process 700, as described herein. Alternatively, the step may be performed by execution of only hardware.

In block 705, end device 130 may determine that end device 130 is nearing or in a component carrier shutoff state. For example, access device 107 may make this determination based on the monitoring service, as described with respect to process 500. By way of further example, end device 130 may measure its own transmit power and compare a transmit power value to a threshold value. Based on a result of the comparison, end device 130 may determine that it is nearing or at an uplink component carrier shut-off state.

In block 710, end device 130 may reduce a transmit power allocation on a secondary component carrier based on the determination. Additionally, or alternatively, end device 130 may shut off a secondary component carrier and sustain or increase the transmit power for another component carrier (e.g., primary and/or secondary component carrier).

FIG. 7 illustrates an exemplary embodiment of a process of the component carrier management service, however according to other exemplary embodiments, the component carrier management service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5, 6, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
analyzing, by a network device of a radio access network, data pertaining to an end device and a carrier aggregation service, wherein the analyzing comprises:
comparing a power headroom value included in the data to a threshold value that is a dynamic value and frequency band, component carrier, and communication plane specific;
determining, by the network device based on the analysis, that the end device is at or near a carrier component shutoff state; and
performing, by the network device in response to the determining, a mitigation procedure directed to the carrier component shutoff state of the end device.

2. The method of claim 1, further comprising:
receiving, by the network device from the end device, a power headroom report that includes the data.

3. The method of claim 1, wherein the analyzing comprises:
analyzing, by the network device, a presence and an absence of uplink transmissions from the end device via component carriers of the carrier aggregation service based on an uplink transmission schedule applicable to the uplink transmissions.

4. The method of claim 1, wherein the performing of the mitigation procedure comprises:
allocating, by the network device for a subsequent allocation, fewer resource blocks on a secondary component carrier of the carrier aggregation service relative to a previous allocation of resource blocks on the secondary component carrier.

5. The method of claim 1, wherein the performing of the mitigation procedure comprises:
allocating, by the network device for a subsequent allocation, fewer secondary component carriers or no secondary component carrier of the carrier aggregation service relative to a previous allocation of the secondary component carriers.

6. The method of claim 1, wherein the performing of the mitigation procedure comprises:
calculating, by the network device, a transmit power value for the end device and a component carrier of the carrier aggregation service based on a power headroom report and a pathloss estimation; and
transmitting, by the network device to the end device, the transmit power value.

7. The method of claim 1, further comprising:
estimating, by the network device, the carrier component shutoff state of the end device based on an estimated uplink pathloss.

8. The method of claim 1, wherein the network device is a next generation Node B (gNB), an evolved Node B (eNB), a distributed unit (DU), or an evolved Long Term Evolution (eLTE) eNB.

9. A network device comprising:
a processor configured to:
analyze data pertaining to an end device and a carrier aggregation service, wherein the network device is of a radio access network, wherein, when analyzing, the processor is further configured to:
compare a power headroom value included in the data to a threshold value that is a dynamic value and frequency band, component carrier, and communication plane specific;
determine, based on the analysis, that the end device is at or near a carrier component shutoff state; and
perform, in response to the determination, a mitigation procedure directed to the carrier component shutoff state of the end device.

10. The network device of claim 9, wherein the processor is further configured to:
receive from the end device, a power headroom report that includes the data.

11. The network device of claim 9, wherein for the analysis, the processor is further configured to:
analyze a presence and an absence of uplink transmissions from the end device via component carriers of the carrier aggregation service based on an uplink transmission schedule applicable to the uplink transmissions.

12. The network device of claim 9, wherein for the performing of the mitigation procedure, the processor is further configured to:
allocate, for a subsequent allocation, fewer resource blocks on a secondary component carrier of the carrier aggregation service relative to a previous allocation of resource blocks on the secondary component carrier.

13. The network device of claim 9, wherein the performing of the mitigation procedure, the processor is further configured to:
allocate, for a subsequent allocation, fewer secondary component carriers or no secondary component carrier of the carrier aggregation service relative to a previous allocation of the secondary component carriers.

14. The network device of claim 9, wherein the performing of the mitigation procedure, the processor is further configured to:
calculate a transmit power value for the end device and a component carrier of the carrier aggregation service based on a power headroom report and a pathloss estimation; and
transmit to the end device, the transmit power value.

15. The network device of claim 9, wherein the processor is further configured to:
estimate the carrier component shutoff state of the end device based on an estimated uplink pathloss.

16. The network device of claim 9, wherein the network device is a next generation Node B (gNB), an evolved Node B (eNB), a distributed unit (DU), or an evolved Long Term Evolution (eLTE) eNB.

17. A non-transitory computer-readable storage medium storing instructions executable by a processor of a network device of a radio access network, which when executed cause the network device to:
analyze data pertaining to an end device and a carrier aggregation service, wherein an analysis includes to:
compare a power headroom value included in the data to a threshold value that is a dynamic value and frequency band component carrier, and communication plane specific;
determine, based on the analysis, that the end device is at or near a carrier component shutoff state; and
perform, in response to the determination, a mitigation procedure directed to the carrier component shutoff state of the end device.

18. The non-transitory computer-readable storage medium of claim 17, wherein the instructions further comprise instructions, which when executed cause the network device to:
receive from the end device, a power headroom report that includes the data.

19. The non-transitory computer-readable storage medium of claim 17, wherein the instructions to analyze further comprise instructions, which when executed cause the network device to:
analyze a presence and an absence of uplink transmissions from the end device via component carriers of the carrier aggregation service based on an uplink transmission schedule applicable to the uplink transmissions.

20. The non-transitory computer-readable storage medium of claim 17, wherein the instructions to perform the mitigation procedure further comprise instructions, which when executed cause the network device to:
allocate, for a subsequent allocation, fewer secondary component carriers or no secondary component carrier of the carrier aggregation service relative to a previous allocation of the secondary component carriers.

* * * * *